US011257025B2

(12) United States Patent
Govekar

(10) Patent No.: US 11,257,025 B2
(45) Date of Patent: Feb. 22, 2022

(54) HIGH PERFORMANCE BLOCKCHAIN ARCHITECTURE FOR LOGISTICS SERVICES

(71) Applicant: Accenture Global Solutions Limited, Dublin (IE)

(72) Inventor: Vivek Govekar, Chicago, IL (US)

(73) Assignee: Accenture Global Solutions Limited, Dublin (IE)

( * ) Notice: Subject to any disclaimer, the term of this patent is extended or adjusted under 35 U.S.C. 154(b) by 43 days.

(21) Appl. No.: 16/402,716

(22) Filed: May 3, 2019

(65) Prior Publication Data

US 2020/0349502 A1 Nov. 5, 2020

(51) Int. Cl.
*G06Q 10/08* (2012.01)
*G06F 16/25* (2019.01)
(Continued)

(52) U.S. Cl.
CPC ....... *G06Q 10/0833* (2013.01); *G06F 16/168* (2019.01); *G06F 16/1805* (2019.01);
(Continued)

(58) Field of Classification Search
CPC ............ G06Q 10/0833; G06Q 10/0832; G06F 16/256; G06F 16/168; G06F 16/1805; H04L 9/0637; H04L 2209/38
(Continued)

(56) References Cited

U.S. PATENT DOCUMENTS 8,725,165 B2   5/2014   Lau et al.
9,641,342 B2   5/2017   Sriram et al.
(Continued)

FOREIGN PATENT DOCUMENTS

WO   WO 2017/027648 A1   2/2017
WO   WO 2019/045739 A1   3/2019
WO   WO-2020081102 A1 *  4/2020   ........... H04L 9/3239

OTHER PUBLICATIONS

Etherscan Block Explorer (Apr. 11, 2018). Obtained using Archive. org. https://etherscan.io/address/0x0117ef7fdb2a5814dff83c50fb799741904cd28d. (Year: 2018).*
(Continued)

*Primary Examiner* — Jeff Zimmerman
*Assistant Examiner* — Hunter A Molnar
(74) *Attorney, Agent, or Firm* — Crowell & Moring LLP

(57) ABSTRACT

A system may include a federated shipping node. The federated shipping node may receive shipping information for a parcel and determine a new shipping state for the parcel based on the shipping information. The federated shipping node may append the new shipping state to a blockchain. In addition, the federated shipping node may store the new shipping state in an off-chain database. A previous shipping state for the parcel may be replaced with the new shipping state in the off-chain database. To display the real-time information related to the parcel, the federated shipping node may receive the new shipping state from the off-chain database, and send the new shipping state to a device for display. To display the historical information related to the parcel, the federated shipping node may receive previous shipping states from the blockchain, and send the previous shipping states to the device for display.

20 Claims, 9 Drawing Sheets

(51) Int. Cl.
*G06F 16/16* (2019.01)
*G06F 16/18* (2019.01)
*H04L 9/06* (2006.01)

(52) U.S. Cl.
CPC ....... *G06F 16/256* (2019.01); *G06Q 10/0832* (2013.01); *H04L 9/0637* (2013.01); *H04L 2209/38* (2013.01)

(58) Field of Classification Search
USPC .......................................................... 705/333
See application file for complete search history.

(56) References Cited

U.S. PATENT DOCUMENTS

| | | | | |
|---|---|---|---|---|
| 2008/0174485 | A1* | 7/2008 | Carani | G06Q 10/08 342/357.46 |
| 2017/0147975 | A1* | 5/2017 | Natarajan | B64C 39/024 |
| 2018/0144298 | A1* | 5/2018 | Rankin | H04L 9/3236 |
| 2018/0220278 | A1* | 8/2018 | Tal | H04W 4/38 |
| 2018/0343114 | A1* | 11/2018 | Ben-Ari | H04L 9/06 |
| 2019/0034404 | A1* | 1/2019 | Anderson | H04L 9/3239 |
| 2019/0190719 | A1* | 6/2019 | van de Ruit | G06F 21/64 |
| 2020/0201683 | A1* | 6/2020 | Muskal | H04L 9/0894 |
| 2020/0252406 | A1* | 8/2020 | Padmanabhan | H04L 9/0891 |

OTHER PUBLICATIONS

Jeff Eckard and Jerry Cuomo. "Storage for blockchain and modern distributed database processing." Feb. 5, 2019. IBM Blockchain Blog. pp. 3-5. (Year: 2019).*
H. R. Hasan and K. Salah, "Blockchain-Based Proof of Delivery of Physical Assets With Single and Multiple Transporters," Aug. 21, 2018, IEEE Access, vol. 6, pp. 46781-46793. (Year: 2018).*
HyperLedger Fabric, "Ledger," dated 2019, pp. 1-14, published online by Hyperledger at URL https://hyperledger-fabric.readthedocs.io/en/release-1.4/ledger/ledger.html#ledger.
Sean Knepper, United States Postal Service, "Priority Mail Express Manifesting Business and Technical Guide, Publication 97," dated Jan. 2017, pp. 1-94, published online by United States Postal Service at URL https://about.usps.com/publications/pub97.pdf.
Extended European Search Report in Europe Application No. 20167709.3, dated May 18, 2020, 9 pages.

* cited by examiner

| Summary View | Reconciled Packages | | Unreconciled Packages |
|---|---|---|---|

| Origin | Destination | Package Type | Data Range |
|---|---|---|---|
| DE | US | Registered | 10/01/2017 – 12/31/2017 |

DISPATCH ID

DERFRAAUSJFKAARA84954
<Back to All Dispatches

🔍 Search by Dispatch ID or Settlement Status

| Package ID | Unreconciled Weight for Package | Shipment Status | Settlement Status | Action |
|---|---|---|---|---|
| ░░░░░░░░░ | 0.80 | ░░ | ░░░░░░░░ | Request Settlement |
| ░░░░░░░░░ | 1.90 | ░░ | ░░░░░░░░ | Request Settlement |
| ░░░░░░░░░ | 1.90 | ░░ | ░░░░░░░░ | Request Settlement |

[ Dispute All ]

702

FIG. 7

HIGH PERFORMANCE BLOCKCHAIN ARCHITECTURE FOR LOGISTICS SERVICES

TECHNICAL FIELD

This disclosure relates to blockchain technology and, in particular, to blockchain technology in high volume logistics systems.

BACKGROUND

Shipping organizations, such as postal services, may transfer parcels between geographic locations. In some circumstances, parcels are shipped between two separate shipping organizations located at distant geographic locations. For example, during inter-postal transfers, parcels may be shipped between the postal services of two different countries. Shipping organizations, such as postal services, may store shipping information for the parcels according to organization specific data structures, formats, and/or protocols. As shipping errors and data inconsistencies arise between shipping organizations, the incompatible infrastructure of the shipping organizations may inhibit accurate and efficient parcel tracking and dispute resolution, particularly in inter-postal settings where monthly transfer volumes exceed several million parcels. Lack of trust amongst the shipping organizations adds to the complexities of settlement dues. Once a parcel is delivered, a destination party may initiate a settlement activity with an origin party, which, in its present form, is error prone and involves largely manual settlement activities that lack reliability and/or uniform repeatability. Management of duplicate packages is also a major challenge in settling disputes between parties.

BRIEF DESCRIPTION OF THE DRAWINGS

The embodiments may be better understood with reference to the following figures and description. The components in the figures are not necessarily to scale. Moreover, in the figures, like-referenced numerals designate corresponding parts throughout the different views.

FIG. 7 illustrates a second interactive view of a graphical user interface;

DETAILED DESCRIPTION

Figure 1:
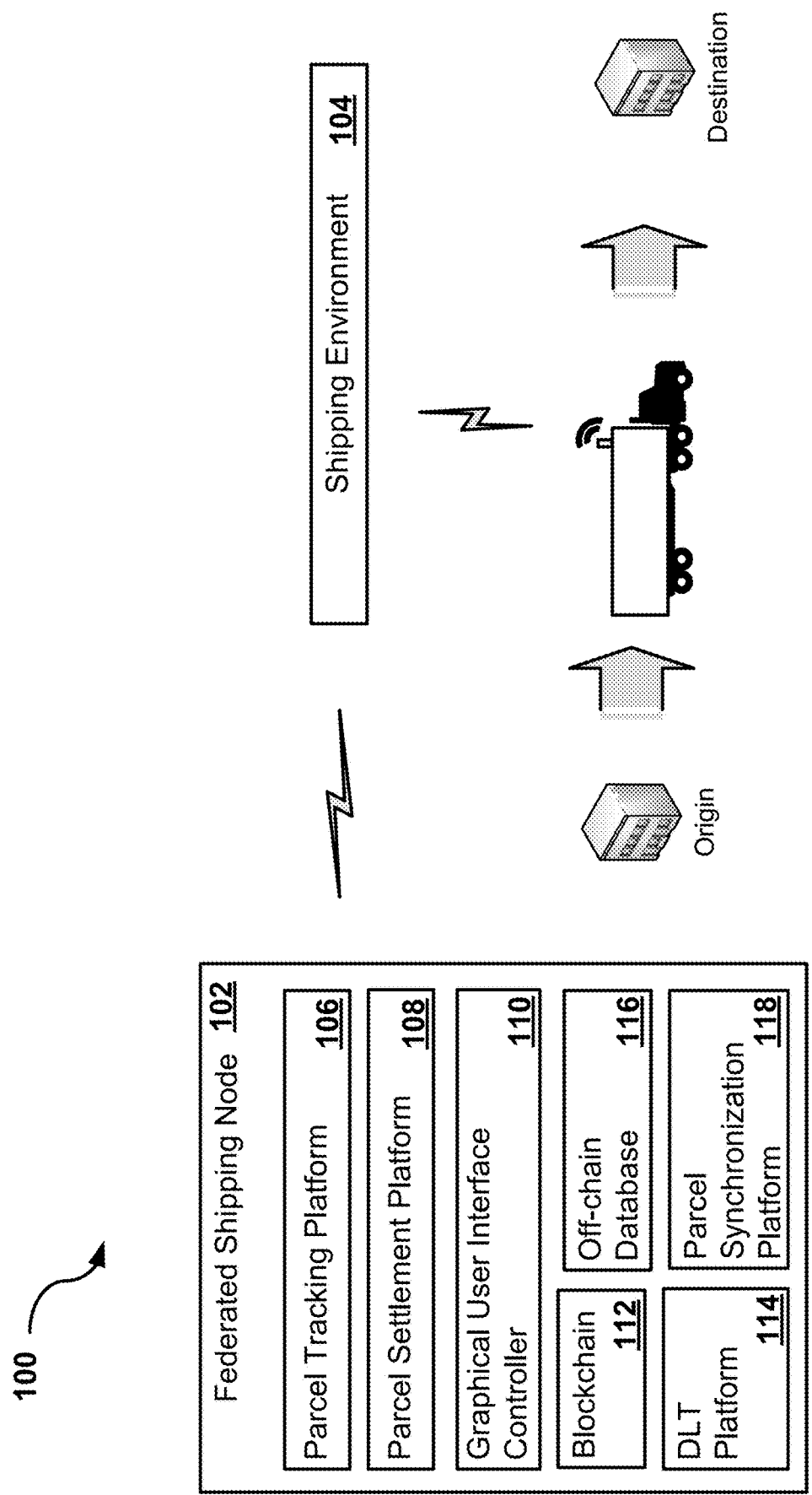
FIG. 1 illustrates a first example of a system.

Distributed ledger technologies, e.g., using blockchain, may provide an immutable record of transactions. Tracking parcel data stored on a blockchain may provide immutability and security advantages over traditional relational data structures. However, the consensus protocols, cryptographic data structures, and other design considerations of distributed ledger technologies may result in inefficient read/write operations, slow system performance, etc., which may inhibit responsive operation and/or scalability. The inefficient read/write operations may also interfere with users' ability to interact with the system and/or obtain up-to-date information using, for example graphical user interfaces. Large transaction volumes, such as those associated with tracking shipping activity, may further exasperate the inefficiencies of blockchain as more data is traversed to perform read operations or build consensus. For example, sizes of blockchains may increase to a point where system operation is degraded.

The system and methods described herein describe high-performance distributed ledger architectures for logistics tracking, management, and dispute resolution. By way of introductory example, the system may include a federated shipping node. The federated shipping node may receive shipping information for a parcel being shipped by a shipping organization. The federated shipping node may determine a new shipping state for the parcel based on the shipping information. The new shipping state may be indicative of shipping progress between an origin location and a destination location. The federated shipping node may append the new shipping state to a blockchain that may include a plurality of previous shipping states. The federated shipping node may store the new shipping state in an off-chain database, e.g., a data storage structure that is separate from the blockchain. A previous shipping state for the parcel may be replaced with the new shipping state in the off-chain database. The federated shipping node may display real-time information for the parcel and/or historical information. To display the real-time information, the federated shipping node may receive the new shipping state from the off-chain database and send the new shipping state to a device for display. To display the historical information, the federated shipping node may receive at least one of the previous shipping states from the blockchain and send the at least one of the previous shipping states to the device for display.

One example of a technical advancement achieved by systems and methods described herein is that a combination of on-chain and off-chain information may be managed and synchronized to achieve responsive and up-to-date parcel tracking while maintaining security and immutability for parcel tracking and dispute resolution. Parcel tracking and dispute resolution information may be stored in both blockchain and off-chain databases that are synchronized across multiple nodes with blockchains where blocksize is dynamically calibrated based on processing load Local updates to parcel tracking and dispute resolution information, stored in off-chain databases, may be quickly synchronized in real time, or near real time, across multiple nodes, while historical updates are synchronized and validated in the blockchain according to a consensus protocol that ensures cryptographic data integrity. Smart contracts may ensure that each node operates under the same set of logic for storing information and performing dispute resolution, regardless of the shipping organization that generates the shipping data. In various implementations, the improvements described herein may enable high speed processing of EDI messages and block transactions in excess of 400 million messages per month.

The systems and methods described herein offer technical innovations and improvements over existing market solutions. Additional or alternative benefits, efficiencies, and improvements over existing market solutions are made evident in the systems and methods described herein.

FIG. 1 illustrates a first example of a system 100. The system 100 may include a federated shipping node 102. The federated shipping node 102 may receive shipping information that can include parcel data. Parcel data may include information related to one or more parcels that are tracked and shipped by a shipping organization. The parcel data may include information descriptive of the parcel, such as dimensional data (e.g. height, length, width), weight, package type, etc. Alternatively or in addition, the parcel data may include location information indicative of the geographic location of the parcel, e.g., the parcel location at a given time, date, event, etc. In some examples, the parcel data may indicate the progress of the parcel though a supply chain. For example, the shipping information may include statuses such as "scanned," "loaded," "in transit," "out for deliver," "delivered," and/or other relevant statuses.

Alternatively or in addition, the shipping information may include dispatch data. Dispatch data may identify groups or collections of parcels that are stored, shipped, and/or grouped together. In some examples, the dispatch data may include an identifier of a vehicle transporting parcels. Alternatively, or in addition, the dispatch data may include geographic location information corresponding to packages included in the dispatch group. For example, the location information may include an address, geographic coordinates, a building name, etc.

In some examples, the shipping information may follow a standardized format. For example, the shipping information may follow an electronic data interchange (EDI) format. In some implementations, the shipping information may comply with the Electronic Data Interchange for Administration Commerce and Transport (EDIFACT), established by the Universal Postal Union (UPU) agency of the United Nations. In other examples, the shipping information may follow additional or alternative formats or EDI formats.

As used herein, a parcel may include a tangible item designated for shipping or transportation. For example, a parcel may include a letter, envelope, package, box, container, etc. In some examples, the parcel may include a label affixed to the parcel, which identifies the parcel. The label may include a bar code, a matrix bar code, or other information that may detected by sensors via scanning, radio-frequency, or other sensing techniques. Alternatively or in addition, the parcel may include a sensing device, such as a radio frequency identification device (RFID), a global position system (GPS) device, transponder, etc., to track, identify and/or track the package. The sensing device may be affixed to, located inside of, or located in proximity to the package. For example, a truck, bin, or container holding the parcel may include the label or the sensing device, which tracks and/or identifies the parcel with a collection of parcels.

The shipping information may be created by a shipping environment 104. The shipping environment 104 may include the infrastructure of a shipping organization (i.e. a postal service, a logistics company, etc.). The shipping environment 104 may include one or more systems, devices, and/or interfaces that track the location of parcels and/or the progress of the parcels between an origin location and a destination location. Alternatively, or in addition, the shipping environment 104 may include one or more servers that host an application programming interface(s), microservice(s), databases(s) and/or other services for sending and receiving shipping information.

In some examples, the shipping environment 104 may create the shipping information while processing of one or more parcels. For example, scanners may detect arrivals, departures, or other events for each parcel. The shipping environment 104 may include, or communicate with, scanners that scan sensors or labels affixed to parcels. For example, the shipping environment 104 may generate the shipping information in response to scanning matrix bar codes or radio-frequency identification (RFID) tags that are affixed to parcels. Alternatively, or in addition, customers, employers, or other end-users of a shipping organization may interact with devices in shipping environment 104 to establish the terms of a shipment. For example, the sender or receiver may contract with a shipping organization by interacting by a user interface for the shipping organization. The user interface may allow a user to create a shipment, establish an origin and/or destination, print a shipping label, etc.

The federated shipping node 102 may receive the shipping information generated by the shipping environment 104. For example, the federated shipping node 102 may include a parcel tracking platform 106. The parcel tracking platform 106 may establish one or more communication channels with the shipping environment 104 to receive the shipping information generated by the shipping environment 104. The parcel tracking platform 106 may communicate with the shipping environment 104 via a network. In some examples, the network may include a wired or wireless wide area network. Alternatively, the federated shipping node 102 may be located proximate to the shipping environment 104, and the parcel tracking platform 106 may communicate with the shipping environment 104 via a wired or wireless local area network. The parcel tracking platform 106 may communicate with the shipping environment 104 via Representational State Transfer (REST), messaging services, application-programming interface (API) procedural calls, and/or other types of communications interfaces. In other examples, the federated shipping node 102 may communicate with the shipping environment 104 via other communication channels, such as inter-process communication on a same sever.

The parcel tracking platform 106 may generate or receive one or more shipping states based on the shipping information. A shipping state may include information representing the progress of a parcel during shipping between an origin and a destination. The shipping progress may describe a location, status, event, or combination thereof for a parcel when the parcel is between an origin and destination. For example, the shipping progress may be derived from the shipping information received by the shipping environment 104. The destination may include a location where a package arrives or is scheduled to arrive. The destination may include the last destination in a shipping route for the parcel or an intermediate destination along a shipping route. The origin may include a location where a package departs or is scheduled or is scheduled to depart. The origin may include an initial origin location or an intermediate location where the parcel departs or is scheduled to depart.

In some examples, the shipping state may follow standard format, such as the EDIFACT. Alternatively, or in addition, the shipping states may be mapped to various enumerated event types in the standard format. Table 1 provides examples of various shipping states based on enumerations of the events according to EDIFACT. For the examples of shipping states listed in Table 1, each row may represent a corresponding one of the shipping states.

TABLE 1

Shipping States

| Description | Code |
|---|---|
| Posting/collection | EMA |
| Arrival at outward office of exchange (OE) | EMB |
| Item presented to export Customs/security | EXA |
| Item held by export Customs/security | EXB |
| Item returned from Customs/security | EXC |
| Item held at outward office of exchange (OE) | EXD |
| Export cancellation | EXX |
| Departure from outward office of exchange | EMC |
| PRE-advice of DESpatch | PREDES |
| PRE-advice of CONsignment | PRECON |
| Arrival at transit office of exchange | EMJ |
| Departure from transit office of exchange | EMK |
| RESponse to CONsignment pre-advice | RESCON |
| Arrival at inward office of exchange | EMD |
| Held at inward office of exchange | EDA |
| Item presented to import Customs | EDB |
| Held by import Customs | EME |
| Item returned from Customs (import) | EDC |
| Departure from inward office of exchange | EMF |
| Item into sorting center | EDD |
| Item out of sorting center | EDE |
| Arrival at delivery office | EMG |
| Item held at delivery depot | EDF |
| Item out for physical delivery | EDG |
| Item arrival at collection point for pick-up | EDH |
| Import cancellation | EDX |
| Unsuccessful (physical) delivery | EMH |
| Final delivery | EMI |

It should be appreciated that the examples of shipping states provided in Table 1 are intended as mere examples. In general, a shipping state may include, or be associated with, any information used for representing the progress of shipping a parcel between source location and a destination location.

In some circumstances, the shipping information provided by the shipping environment 104 may not reflect the realities experienced by stakeholders associated with the package, such as sender, a receiver, and/or other actors involved in the shipment of a parcel. The stakeholders may desire to dispute various aspects of a parcel shipment, such as the timing of the arrival, the condition of the parcel upon arrival, the alleged location of the package, etc.

Figure 3:
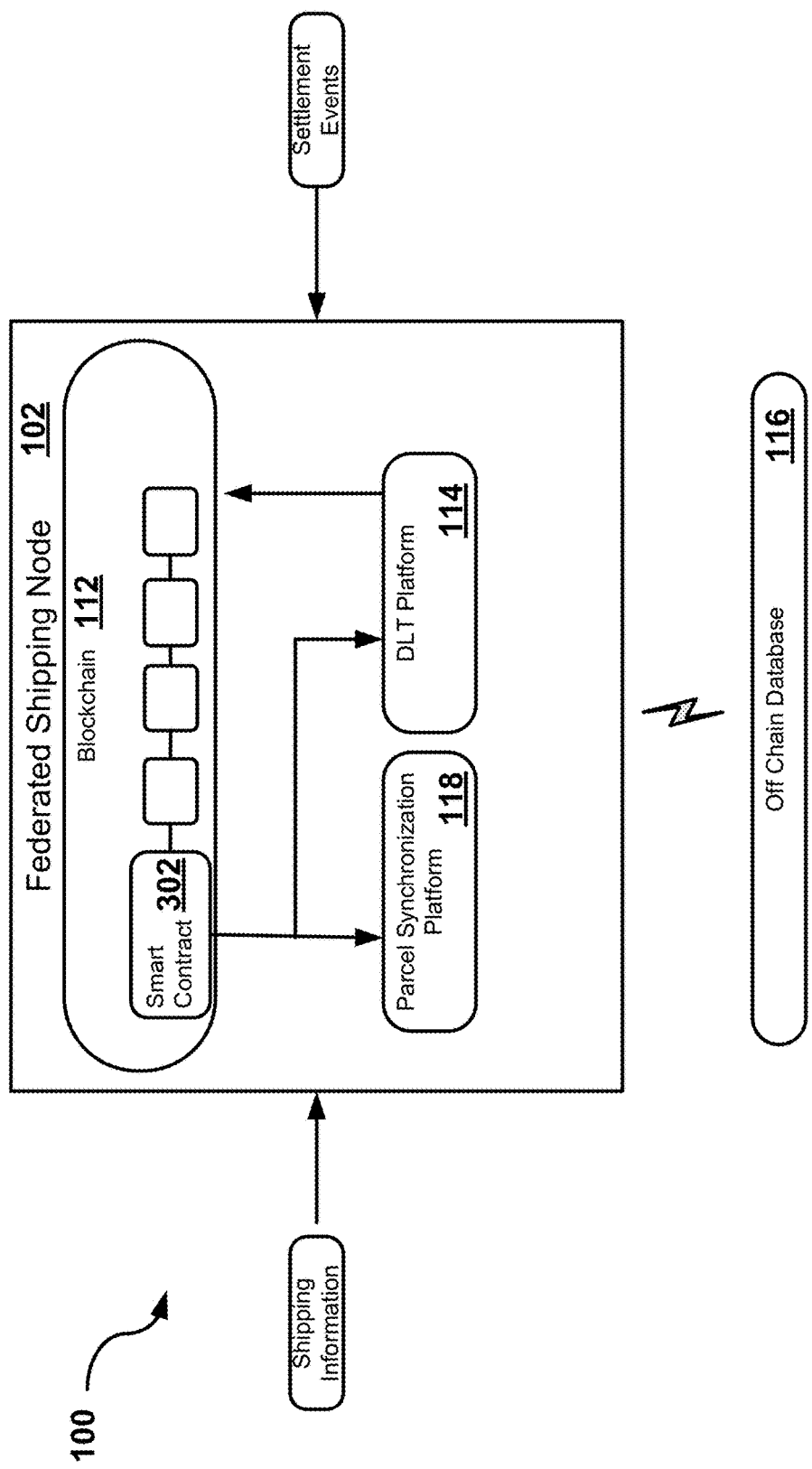
FIG. 3 illustrates a second example of the system.
Figure 4:
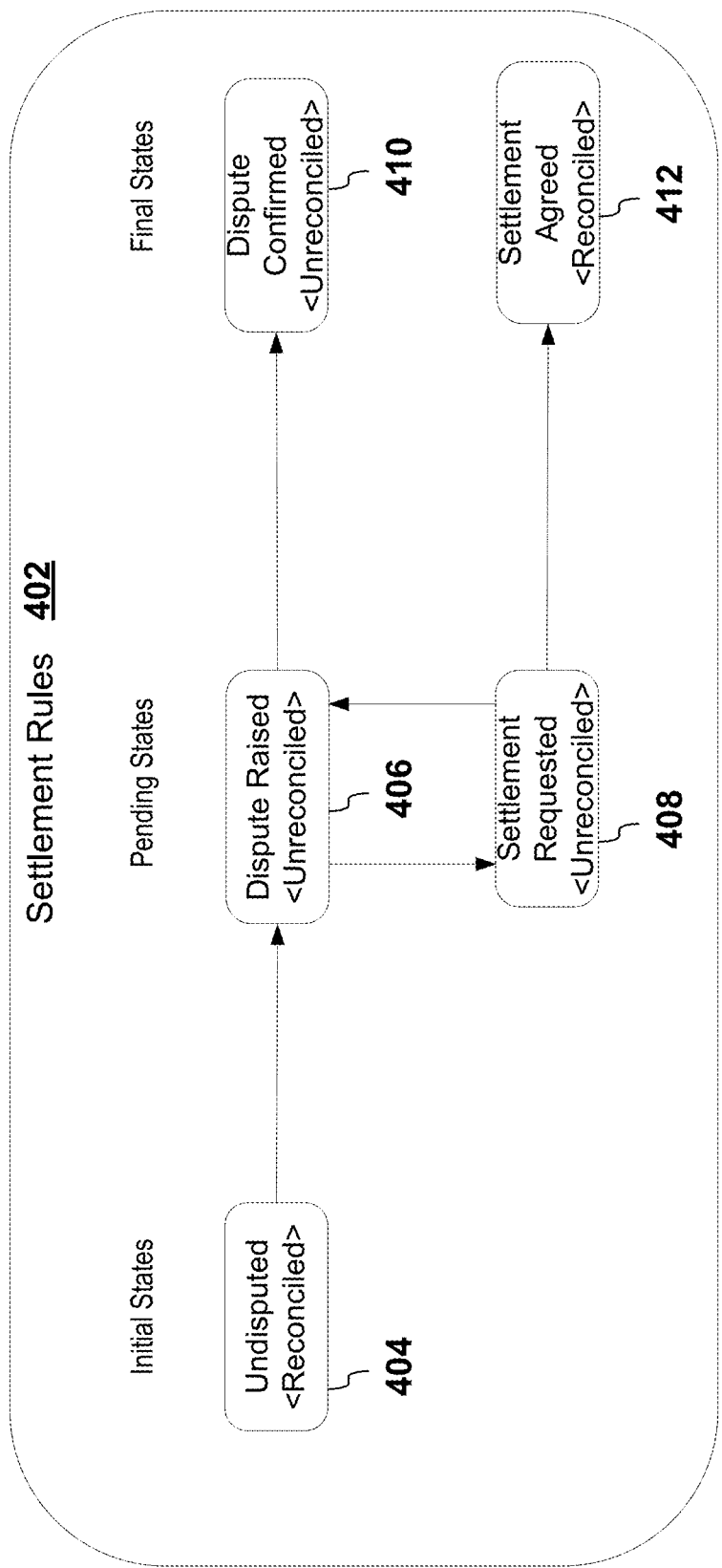
FIG. 4 illustrates a logical representation of settlement rules.

The federated shipping node 102 may include a parcel settlement platform 108. The parcel settlement platform 108 may receive settlement events. A settlement event may represent an agreement or disagreement related to the status, location, condition, or any other aspect of a parcel. The parcel settlement platform 108 may transition a parcel between settlement states based on settlement rules. In some examples, the parcel settlement platform 108 may access a smart contract, which includes logic for transitioning the settlement status of a parcel between settlement states. FIG. 3, and the related description, provides examples of a smart contract. FIG. 4, and the related description, provides examples of various settlement states and settlement rules.

Figure 6:
FIG. 6 illustrates a first interactive view for a graphical user interface.
Figure 8:
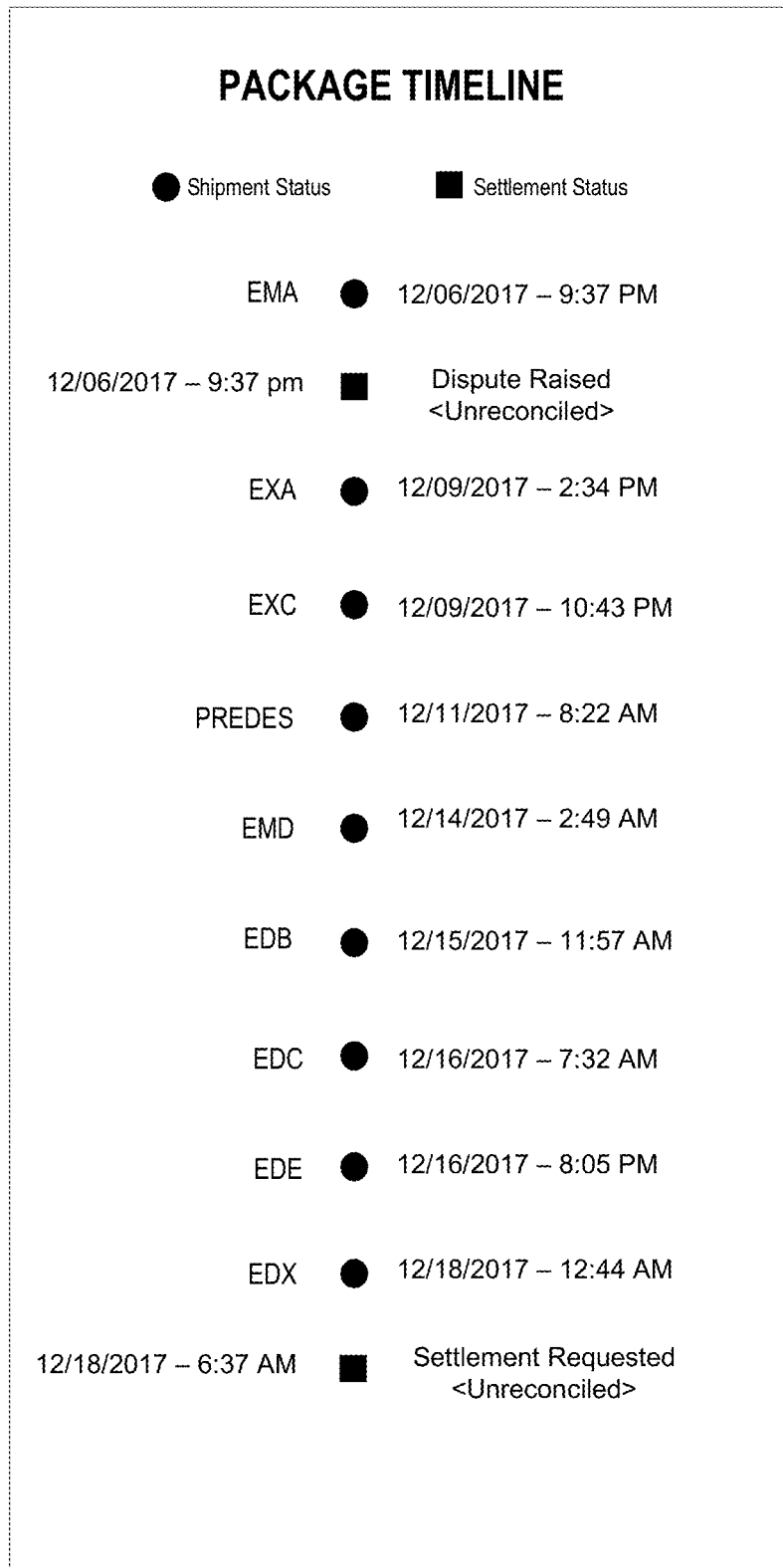
FIG. 8 illustrates a third interactive view of a graphical user interface.

In some examples, a user or device may initiate the settlement events via a graphical user interface. The federated shipping node 102 may include a graphical user interface controller 110. The graphical user interface controller 110 may generate one or more interactive views for a graphical user interface. The interactive views may include the shipping states and/or shipping information of a parcel, or parcels. Alternatively, or in addition, the interactive views may include controls to raise, dispute, investigate, and/or resolve issues related to parcel shipment. For example, the graphical user interface controller 110 may generate one or more settlement events based on interaction with the graphical user interface FIGS. 6-8 illustrate examples of various interactive views.

The shipping environment 104 may be one of many shipping environments involved in the shipping of a parcel. For example, the parcel may be shipped via multiple shipping environments located in multiple geographic locations. For example, a parcel may travel through postal services of various countries, and each postal service may include a separate shipping infrastructure. Alternatively, or on addition, the shipping environment 104 may span multiple geographic locations. For example, a shipping organization, such as the United States Postal Service, may include sorting facilities that generate shipping information at separate geographic locations where parcels are processed.

The federated shipping node 102 illustrated in FIG. 1 may be one of many nodes that process shipping information generated by one or more shipping environments. The federated shipping node 102 may synchronize and/or validate shipping states, settlement states, and other stored shipping information between federated shipping nodes.

The federated shipping node 102 may include a blockchain 112. The blockchain 112 may include a local instance of a distributed ledger that is organized, and/or implemented according a distributed ledger technology (DLT). The blockchain 112 may include datablocks that are linked according to a cryptographic algorithm. The arrangement of data blocks and associations between information stored in the data blocks are established by the DLT. The blockchain 112 may provide a growing, shared digital data flow, which serves as the source of truth between distributed ledger participants. Depending on the DLT, the datablocks of the blockchain 112 may include a genesis datablock that is the initial datablock of the blockchain 112. Successive datablocks may be appended to the blockchain 112 over time. The blockchain 112 may provide a chronological ledger of information. One or more of the successive datablocks may include a hash of a previous datablock, a header of the previous datablock, and/or other portions of the previous datablock, depending in the DLT.

The federated shipping node 102 may include a DLT platform 114. The DLT platform 114 may include logic, rules, and instructions for accessing, storing, modifying, and/or validating the blockchain 112. Alternatively, or in addition, the DLT platform 114 may implement a consensus protocol, which is set of rules for adding, deleting, modifying, and/or validating data across multiple blockchains of the distributed ledger. Transactions may be submitted to the DLT platform 114 to append, remove, modify, and/or update the blockchain 112. In some examples, the consensus protocol of the DLT platform 114 may prohibit attempts to modify the blockchain 112 unless a majority, or some other predefined number, of distributed ledger participants consent to the modifications. A distributed ledger participant may include another node (such as other federated shipping node) that also stores or has access to the DLT platform 114 and a local copy of the blockchain 112. The DLT platform 114 on each of the participants ensures that the validated blockchain is synchronized across the nodes. In the event that modifications to one or more datablocks in the blockchain 112 cause inconsistencies in the cryptographic information stored in the successive datablocks, the DLT platform 114 may detect the inconsistencies and prevent modification to previously appended information in the blockchain 112.

The blockchain 112 of the federated shipping node 102 may store the shipping states, settlement states, and/or the shipping information. For example, the parcel tracking platform 106 may generate a shipping state and submit the shipping state to the DLT platform 114. The parcel settlement platform 108 may generate settlement states and submit the settlement states to the DLT platform 114. In some examples, the DLT platform 114 may include the shipping event and/or settlement state in a transaction. The DLT platform 114 may communicate with other participants (i.e. other federated shipping nodes) of a distributed ledger to validate the transaction. For example, the DLT platform 114 may acquire consensus from other participants to determine that appending the transaction to the blockchain 112 is authorized. In response to the transaction being validated, the DLT platform 114 may append the shipping state and/or settlement state to the blockchain 112.

In some examples, the blockchain 112 may store a parcel token. A parcel token may represent a physical parcel. For example, the parcel token may include an identifier of the parcel. Alternatively, or in addition, the parcel token may include physical description (e.g. dimensions, weight, appearance, etc.), and other descriptive information about the parcel. For example, the parcel token may include the shipping state, the settlement state, or shipping information related to the parcel token. The parcel token may be updated by appending information to the blockchain 112 that references or identifies the parcel token. The blockchain 112 may be queried for parcel token and receive a historical information related to the parcel token, including, for example, shipping state, the settlement state, descriptors, and/other information related to the parcel stored on the blockchain 112. Information included in, or related to, a parcel token may be identified by traversing historical datablocks added to the blockchain. Thus, modifications to the parcel token may be audited by traversing the blockchain 112.

The advantages afforded by blockchain technology may, among other benefits, provide an immutable record of historical information for a parcel. However, the data structures, consensus protocols, and other design considerations of a blockchain may inhibit responsive reporting related to a parcel or group of parcels. Since the shipping environment 104 may generate large amounts of shipping information at multiple geographic locations, processing the shipping information provided by the shipping environment 104 may consume large amounts of computer resources, such as processing cycles and/or time, network resources, memory, etc. As quantities of information increase on the blockchain 112 (e.g., via storage of historical information) response times for on-chain queries may increase. In addition, blockchain validation and maintenance operations, including, for example, operations related to consensus building among participants of a distributed ledger, may inhibit response times (e.g., by increasing response times) for blockchain operations, such as create, search, update, and/or delete.

The federated shipping node 102 may gain efficiencies by tuning various parameters of the blockchain 112 and/or the shipping node 102 that host the blockchain 112. For example, the block size of new blocks stored on the blockchain 112 may be dynamically adjusted in order to adapt to variations in shipping information processed at the shipping node 102. In some examples, the shipping node 102 may detect an increase in shipping information received by the shipping node 102 (e.g. 10%). The shipping node 102 may increase the block size in order to increase storage and network throughput. The shipping node 102 may return the block size to a previous level after a predetermined time or after the amount of shipping information received over a time period returns back to a desired level, e.g., a normal or typical level. Increasing the block size may increase data storage per transaction, resulting in higher throughput. In some examples, the CPU count and memory allocation to the shipping nodes may be adjusted on a node-by-node basis to allocate sufficient throughput, latency, and/or processing times to handle shipping information locally received at each node.

The federated shipping node 102 may gain additional or alternative efficiencies through supplemental storage architectures. The federated shipping node 102 may include an off-chain database 116. Alternatively, the off-chain database 116 may reside outside of the federated shipping node 102 as part of, for example, a cloud storage (see FIG. 2). The off-chain database 116 may include a database separate from the blockchain 112 that stores recent information related to a parcel. For example, the off-chain database 116 may include a cache of the recent parcel data that is stored on the blockchain 112. As new parcel information from the shipping environment 104 becomes available, the new parcel information may replace the previous parcel information stored in the off-chain database 116. The off-chain database 116 may include a relational database, a non-relational database, an in-memory database, or some other suitable storage.

In some examples, the off-chain database 116 may store a parcel data object. The parcel data object may represent a physical parcel and/or a parcel token stored on the blockchain 112. The parcel data object may include recent shipping information and/or recent dispute resolution information of a parcel stored on the blockchain. For example, the parcel data object may include information from recent blockchain transaction(s) to update a parcel token stored on the blockchain.

In some examples, the parcel data object may include information from the most recent blockchain transactions. In other examples, the parcel data object may include information from recent transactions over a configurable time period. The shipping node 102 may dynamically adjust the time period. For example, during periods of high throughput, the shipping node 102 may increase the time-period to cause parcel data object to cache more information related to the parcel. Increasing the time-period may complement increasing the block size of datablocks on the blockchain 112. For example, increasing the block size may slow down query times because each data block includes more information to parse. Accordingly, the off-chain database 116 may cache additional information while block sizes are larger such that more information is accessible from the off-chain database 116, which may include relational data structures tailored for efficient search.

In some examples, the parcel data object may comprise a plurality of data fields that represent a parcel token stored on the blockchain 112. The data fields may include parcel identifier, a tracking field, a settlement field, a descriptor field, and dispatch field, and/or other fields representative of the recent or latest updates to a parcel token. The shipping field may include information from a recent, e.g., a latest, shipping state. The settlement field may include the recent settlement state for the parcel. The descriptor field may include information that describes attributes of the parcel (e.g. height, width, weight, etc.). The dispatch field may include an identifier of a batch of parcels being grouped together for transportation. In some examples, the parcel identifier and/or the dispatch identifier (and/or other uniquely identifying information) may be stored in both the blockchain 112 and the off-chain database 116 so that information from the blockchain 112 may be identified and/or aligned with information stored in the off-chain database 116.

In some examples, the parcel data object may be associated with a cache time threshold. The cache time threshold may include a time that delineates recent information from historical information. The shipping node 102 may query data stored before the cache time threshold from the blockchain 112. The shipping node 102 may query data stored after the cache time stamp from the off-chain database 116. The cache time threshold may include a time stamp (e.g. a recorded time) and/or a time offset (e.g. a number of seconds, minutes, hours, etc.).

The federated shipping node 102 may include a parcel synchronization platform 118. The parcel synchronization platform 118 may synchronize the off-chain database 116 with off-chain databases configured on other federated shipping nodes. The parcel synchronization platform may receive updated shipping information, an updated shipping state, and updated settlement state, or other updated information related to a parcel. The parcel synchronization platform 116 may store the updated information in the off-chain database and/or synchronize the updated information with other parcel synchronization platforms on separate federated shipping nodes. Alternatively or in addition, the parcel synchronization platform may receive updated information from the other federated shipping nodes, and update a local copy of parcel information stored in the off-chain database 116.

Figure 2:
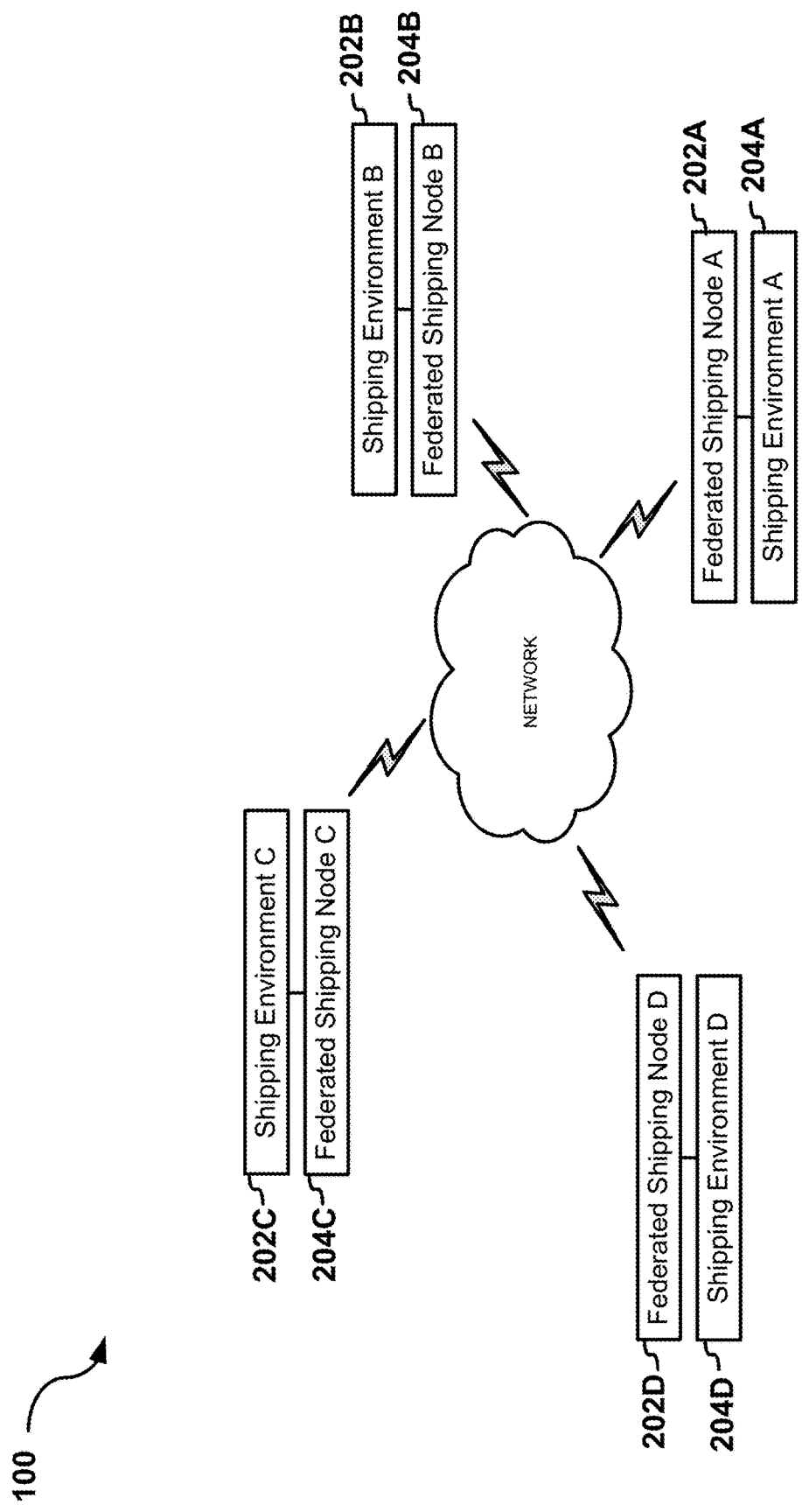
FIG. 2 illustrates an example of a network of federated shipping

FIG. 2 illustrates an example of a network of federated shipping nodes 202A-D. Each of the federated shipping nodes 202A-D may include an implementation of the federated shipping node 102 described in reference to FIG. 1. The network of federated shipping nodes illustrated in FIG. 2 may include additional or fewer federated shipping nodes that shown.

The federated shipping nodes 202A-D may communicate with respective shipping environments 204A-D. In some examples, each of the respective shipping environments 204A-D may be located at a separate geographic location. By way of example, the respective shipping environments 204 may include shipping environment A 204A, which is a package processing plant for the United State Postal Service. Shipping environment B 204B may include a package processing plant for the Japan Post.

The respective shipping environments 204A-D may locally process large quantities of parcels (e.g., hundreds, thousands, or tens of thousands per day). The federated shipping nodes 202A-D may locally receive the shipping information generated by the respective shipping environments 204A-D. In some examples, each federated shipping nodes 202A-D may be located proximate to a corresponding one of the respective shipping environments 204A-D. For example, one of the federated shipping nodes 204A-D may be located in the same country or at the same hosting premises as one of the respective shipping environments 204A-D.

The federated shipping nodes 202A-D may store shipping information on local blockchains that are part of a distributed ledger. Each of the federated shipping nodes 202A-D may participate in the distributed ledger, resulting in the blockchain being validated and synchronized between the federated shipping nodes 202A-D. For example, the federated shipping nodes 202A-D may include local instances of a DLT platform (see FIG. 1 for examples a DLT platform). Accordingly, the processing load for interpreting, translating, and responding to the shipping information generated by the respective shipping environments 204A-D is spread across the federated shipping nodes 202A-D and the processing results (i.e. shipping states) are validated and synchronized using distributed ledger technology.

The federated shipping nodes 202A-D may include corresponding off-chain databases to store the recent or latest parcel information. The federated shipping nodes 202A-D may synchronize local updates to the off-chain databases. The off-chain databases of the federated shipping nodes 202A-D may provide a source of real-time information related to a parcel's current status. Real-time information may include recent information associated with a parcel that is stored on a blockchain (or submitted to be stored on a blockchain) but not accessed from a blockchain for display. Thus, users operating graphical user interfaces provided may see updates to parcel data objects, without waiting for DLT synchronization or blockchain traversal. Moreover, the off-chain databases may improve the responsiveness of graphical user interfaces because of improved read/write speeds.

By way of example, federated shipping node A 202A located in the United States may receive shipping information for parcel XYZ. The shipping information may include a location update for the parcel XYZ that indicates arrival in Chicago. Federated shipping node A 202A may update a location field of a parcel data object for parcel XYZ stored in a local off-chain database. The location field may be updated to reflect that parcel XYZ is now located in Chicago. The change to the parcel data object may be propagated to other federated shipping nodes, such as federated shipping node B 202B, located in Japan. Federated shipping node B 202B may update a local copy of the parcel data object to reflect the parcel is located Chicago. A first user accessing federated shipping node A 202A and a second user accessing federated shipping node B 202B may view changes to the parcel data object based on information provided by local off-chain databases. The off-chain database 116 may provide the recent information related to the parcel, without inhibiting search time or waiting for blockchain synchronization. The validity of the information obtained by the off-chain database 116 will be backed up by an immutable and secure distributed ledger record, once distributed ledger is validated and synchronized.

FIG. 3 illustrates a second example of the system. The off-chain database 116 may be located outside of federated shipping node 102. For example, the off-chain database 116 may be included in a cloud storage platform for a cloud service provider (e.g. AMAZON WEB SERVICES, MICROSOFT AZURE, etc.). The parcel synchronization platform 118 may synchronize the data of the off-chain database 116 across multiple distributed instances of the off-chain database 116 located at various geographic locations. Alternatively, an external synchronization framework may provide the synchronization between off-chain database instances. For example, the cloud storage platform may include native synchronization frameworks that ensure data is synchronized between off-chain database instances.

The blockchain 112 may include a smart contract 302. The smart contract 302 may include logic that facilitates, verifies, and/or enforces the negotiation or performance of a contract or agreed upon protocol of performance. The smart contract 302 may be included in the blockchain 112 to help manage the processing and storage of shipping information and/or settlement events. The smart contract 302 may include rules, instructions, and/or logic that are executable to process and/or store the shipping information, the settlement events, or any combination thereof. The smart contract 302 may include self-executing logic that detects information, performs computer-implemented actions, or responds to events in any way that is proposed or agreed upon between one or more parties.

In some examples, the smart contract 302 may be stored in the blockchain 112 and replicated on other federated shipping nodes. Thus, the federated shipping node 102 may process the shipping information and/or the settlement events on a manner consistent with other federated shipping nodes. Because the logic of the smart contract 302 is stored in the blockchain 112, unauthorized changes to the logic are minimized and easily detected. Authorized changes to the logic are recorded on the blockchain 112 such that the blockchain 112 provides an auditable record of all changes to the executing logic and/or the parties that authorized the changes. Updates to the smart contract 302 are tracked and deployed to other federated shipping nodes that are participants of a distributed ledger for the blockchain 112.

In some examples, the smart contract 302 may include storage logic. The storage logic may include logic for storing new information related to a parcel. For example, the storage rules may include logic to store a new shipping state and/or a new settlement state in both the blockchain 112 and the off-chain database 116. The storage logic may communicate the new shipping event and/or the new settlement state to the DLT platform 114 and/or the parcel synchronization platform 118. The DLT platform 114 may perform consensus verification and then append the new shipping state and/or new settlement state to the blockchain 112. The parcel synchronization platform 118 may store the new shipping state and/or the new settlement state in the off-chain database 116. Alternatively, or in addition, the parcel synchronization platform may communicate the new shipping state and/or the new settlement state to a remote off-chain database or a remote parcel synchronization platform configured on another federated shipping node.

In some examples, the smart contract 302 may include instructions, rules, and/or logic used to determine a settlement state. For example, the smart contract 302 may include settlement rules. Settlement rules may include rules to determine a new shipping state based on a settlement event. FIG. 4, and the related description, provides additional details regarding the settlement rules and/or the settlement states.

FIG. 4 illustrates a logical representation of settlement rules 402. The settlement rules 402 may govern how a settlement status transitions between settlement states. The settlement status may refer to the status of an agreement between the shipper and the receiver of a parcel as to the contracted delivery of the parcel. The settlement status may traverse between various settlement states. In some examples, the rules for switching between settlement states may be governed by the settlement rules 402.

The settlement states may include a one or more initial states, one or more pending states, and one or more final states. The one or more initial states may include an undisputed state 404. The undisputed state 404 may be a default state for a parcel. For example, a parcel may arrive at a destination. The receiver of the parcel may take custody of the parcel and raise no concerns or issues related to the parcel. The settlement status of the parcel may be set to the undisputed state 404.

When a concern is raised related to the package, the settlement status of the parcel may transition from the undisputed state to the dispute raised state 406. The dispute raised state may represent a state of the package where a concern or issue about the parcel is received. For example, the parcel may have never been received by the receiver (even when the shipping organization logs the parcel as received). In other examples, the parcel may have shipping damage.

When an attempt to remedy a concern about a package has been made, the settlement status of the parcel may transition from the disputed raised state 406 to the settlement requested state 408. The settlement requested state 408 may represent a state where the shipping organization and/or the sender have made an attempt to remedy concerns raised about the parcel. For example, the shipping organization or the sender may offer a refund or some other form of compensation.

In some circumstances, the settlement status may transition back and forth between the disputed raised state 406 and the settlement requested state 408. For example, the receiver may decline remedies offered by the sender or shipping organization.

The settlement status may transition from the disputed raised state 406 to a dispute confirmed state 410. The dispute confirmed state 410 may represent a state where the shipping organization or sender is unable to remedy issues raised by the receiver. Alternatively, or in addition, the settlement status may transition from the settlement requested state 408 to settlement agreed state 412. The settlement agreed state 412 represents agreement between the receiver and the sender or shipping organization.

In some examples, each of the states may be associated with a state type tag. For example, the undisputed state 404 and the settlement agreed states may be associated with a reconciled tag and/or an unreconciled tag. The reconciled tag may represent a state type representative of no active disputes regarding a parcel (or parcels). The unreconciled tag represents a state type representative of active disputes regarding a parcel (or parcels). The reconciled, unreconciled tags, and/or the settlement states may be search criteria applied in conjunction with the off-chain database 116 (see FIG. 1 and FIG. 3) to rapidly identify particular parcels that match the search criteria. Once a parcel, or a result set of parcels, are identified, the blockchain 112 may be queried to obtain historical information.

Figure 5:
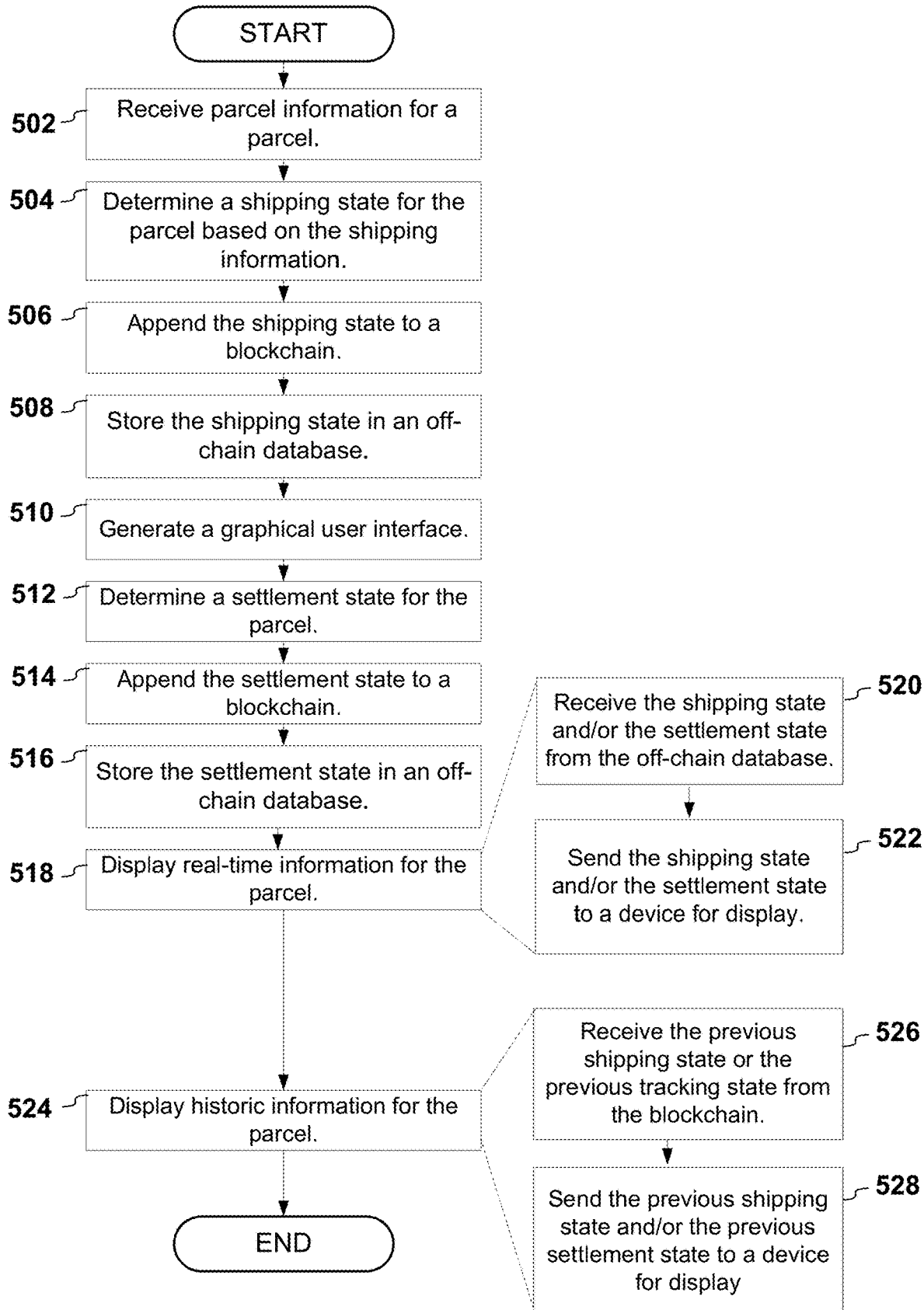
FIG. 5 illustrates a flow diagram for example logic of a system.

FIG. 5 illustrates a flow diagram for example logic of the system 100. The federated shipping node 102 may receive parcel information for a parcel (502). The shipping information may be generated by the shipping environment 104. For example, sensors may generate scanning information from RFIDs, bar codes, or other information. The scanning information may be processed by the shipping environment 104 to generate the shipping information. In some examples, the shipping information may be formatted and organized according to EDIFACT, or some other structured format.

The federated shipping node 102 may determine a shipping state for the parcel based on the shipping information (504). The shipping state may indicate the progress of shipping the parcel between an origin location and a destination location. In some examples, the federated shipping node 102 may parse or extract the shipping state, or other information from the shipping information. For example, the federated shipping node 102 may apply natural language processing, such as, for example, regular expression matching, chunking, and/or phrase recognition, to parse or extract the shipping state from the shipping information. In some examples, the shipping state may include an enumerated value or code, such as one or more of the event codes listed in Table 1.

The federated shipping node 102 may append the shipping state to the blockchain 112 (506). For example, the federated shipping node 102 may submit the shipping state to the DLT platform 114. The DLT platform 114 may generate a transaction that is validated based on consensus with other federated shipping nodes that are participants of a distributed ledger that includes the blockchain 112. The DLT platform 114 may append the shipping state to the blockchain 112 in response to the transaction being validated.

The federated shipping node 102 may store the shipping state in the off-chain database 116 (508). For example, the federated shipping node 102 may replace a previous shipping state for the parcel with the shipping state. In some examples, the off-chain database 116 may store a parcel data object. The parcel data object may include data fields. The data fields may include a shipping data field. The shipping data field may be updated from the previous shipping state to the new shipping state.

In some examples, the federated shipping node 102 may synchronize the off-chain database 116 with other federated shipping nodes. For example, the off-chain database 116 may include a first off-chain database. The federated shipping node 102 may synchronize the first off-chain database with a second off-chain database hosted at a second geographic location that is different from the first geographic location.

The federated shipping node 102 may generate a graphical user interface (510). The graphical user interface may show real-time information for a parcel and/or historical information for the parcel. The real-time information may include information associated with the parcel obtained from the off-chain database 116. The historical information may include information obtained from the blockchain 112. In some examples, a first portion of the graphical user interface may include the real-time information and a second portion of the graphical user interface may include historical information for the parcel. The first portion may be separate from the second portion. Alternatively, or in addition, the second portion may be loaded in response to interaction with the first portion. For example, the first portion may include a control (e.g. a label called "details") that when selected loads the second portion. In other examples, real-time information obtained from the off-chain database 116 may be displayed in a first interactive view (e.g. a web page or a form) and historical information may be displayed in a second interactive view.

The federated shipping node 102 may determine a settlement state for the parcel (512). For example, the graphical user interface may include controls to raise a settlement event. The settlement event may be detected by the federated node in response to interaction with one or more control on the graphical user interface. In some examples, federated shipping node 102 may obtain settlement rules that govern transitions between states. For example, the settlement rules may be included in a smart contract stored on the blockchain 112. The settlement rules may determine a new settlement state based on previous settlement state and/or the settlement event.

The federated shipping node 102 may append the settlement state to the blockchain 112 (514). For example, the federated shipping node 102 may submit t the settlement state to the DLT platform 114. The DLT platform 114 may generate a transaction that is validated based on consensus with other federated shipping nodes that are participants of a distributed ledger that includes the blockchain 112. The DLT platform 114 may append the settlement state to the blockchain 112 in response to the transaction being validated.

The federated shipping node 102 may store the settlement state in the off-chain database 116 (516). For example, the federated shipping node 102 may replace a previous settlement state for the parcel with the settlement state. In some examples, the off-chain database 116 may store a parcel data object. The parcel data object may include data fields. The data fields may include a settlement data field. The shipping data field may be updated from the previous settlement state to the new settlement state.

The federated shipping node 102 may display (or cause display of) real-time information for the parcel (518). To display the real-time information, the federated shipping node 102 may receive the shipping state and/or the settlement state from the off-chain database 116 (520). The federated shipping node 102 may send the shipping state and/or the settlement state to a device for display (522). For example, the federated shipping node 102 may send instructions, such as HTML instructions, to the device to display the real-time information. The real-time information may include the shipping state obtained from the off-chain database 116.

The federated shipping node 102 may display (or cause display of) historic information for the parcel (524). The federated shipping node 102 may receive the previous shipping state from the blockchain 112 (526). The federated shipping node 102 may send the previous tracking state to the device for display (528). For example, the federated shipping node 102 may send an instruction to display the previous tracking state (or multiple previous tracking states) obtained from the blockchain 112.

The historic and real-time information may be displayed on the on a user interface separately and/or in combination. In some examples, the real-time information may be displayed first, and then the historical information is displayed in response to interaction with labels, controls, or other graphical user interface features representative of the real-time information. Accordingly, the recent and relevant information related to the parcel may be displayed quickly to allow a user to view and interact with information provided by the off-chain database 116.

The real-time information and the historic information may be synchronously displayed. By way of example, parcel data may be mapped to parcel identification information (e.g. a unique identifier) in both the off-chain database 116 and the blockchain 112. The off-chain database 116 and blockchain 112 may be queried based on the parcel identification information. Alternatively or in addition, the parcel data stored in the off-chain database 116 may be associated with a cache time threshold. The cache time threshold may include a time that delineates recent information from historical information. Parcel data stored before the cache time stamp may be queried from the blockchain 112. Parcel data store after the cache time stamp may be queried from the off-chain database 116.

The logic illustrated in FIG. 5 may include additional, different, or fewer operations than illustrated. The operations illustrated may be performed in an order different than illustrated.

FIG. 6 illustrates a first interactive view 602 for a graphical user interface. The first interactive view 602 may include a summary of parcel information. The federated shipping node 102 may generate the first interactive view 602 by pulling information associated with the parcels from the off-chain database 116. For example, the off-chain database 116 may associate parcel data objects with settlement states. As discussed in reference to FIG. 4, the settlement state may be associated with various state information that may be filter parameters for searches in the off-chain database 116.

The federated shipping node 102 may determine summary metrics based on associations stored in the off-chain database 116. For example, the federated shipping node 102 may count the parcel data objects associated with reconciled state types, or other information associated with the parcel data objects. Alternatively, or in addition, the federated shipping node 102 may determine total reconciled parcel weight, total unreconciled items, total unreconciled parcel weight, or any other value that may be derived based on information associated with the parcel data objects. The summary metrics may be calculated faster by obtaining running queries against the off-chain database 116 because execution of the queries will be unhindered by large amounts of historical data stored on the blockchain 112 or traversing large quantities of datablocks on the blockchain. For example, the off-chain database 116 may determine all the parcels associated with a reconciled state in the off-chain database 116 faster than in the blockchain 112.

FIG. 7 illustrates a second interactive view 702 of a graphical user interface. The second interactive view 702 may include a table that displays data fields of a parcel data object. For example, the table may display a parcel identifier, a parcel weight, a shipping state, and a settlement state. Alternatively, or in addition, the second interactive view 702 may include a control that enables a user to select the next settlement state. In response to interaction with the control, a settlement event may be generated. The settlement event may be processed by the settlement rules (see FIG. 4) to determine a new settlement state for a parcel. The federated shipping node 102 may append the new sentiment state to the blockchain 112 and store the new settlement in the off-chain database 116.

In some examples, the second interactive view 702 may be loaded by multiple federated shipping nodes at various geographic locations. For example, a first user may access the first interactive view, which is generated by a first federated shipping node and a second user may access the second interactive view, which is generated by a second federated shipping node. The off-chain databases of each of the federated shipping nodes may be synchronized in real time, or near real time, allowing the users at each respective location to view updates in real time.

FIG. 8 illustrates a third interactive view 802 of the graphical user interface for the system 100. The third interactive view 802 may include historic shipping states and/or historic the settlement states arranged in chronological order for a parcel of interest. The shipping states and/or the settlement states may be obtained from the blockchain 112. Alternatively, or in addition, at least some of the shipping states and/or settlement states may be obtained from the off-chain database 116. In some examples, the third interactive view may be loaded after a particular parcel was identified based on searching and filtering is performed in the off-chain database 116. After a parcel of interest is quickly identified by searching the off-chain database 116, the historical information shown in FIG. 8 may be loaded.

The interactive views described in reference to FIGS. 6-8 may be displayed on all or a portion a visible region of a graphical user interface. The interactive views, or instructions to create the interactive views may be generated by the federated shipping node 102.

Figure 9:
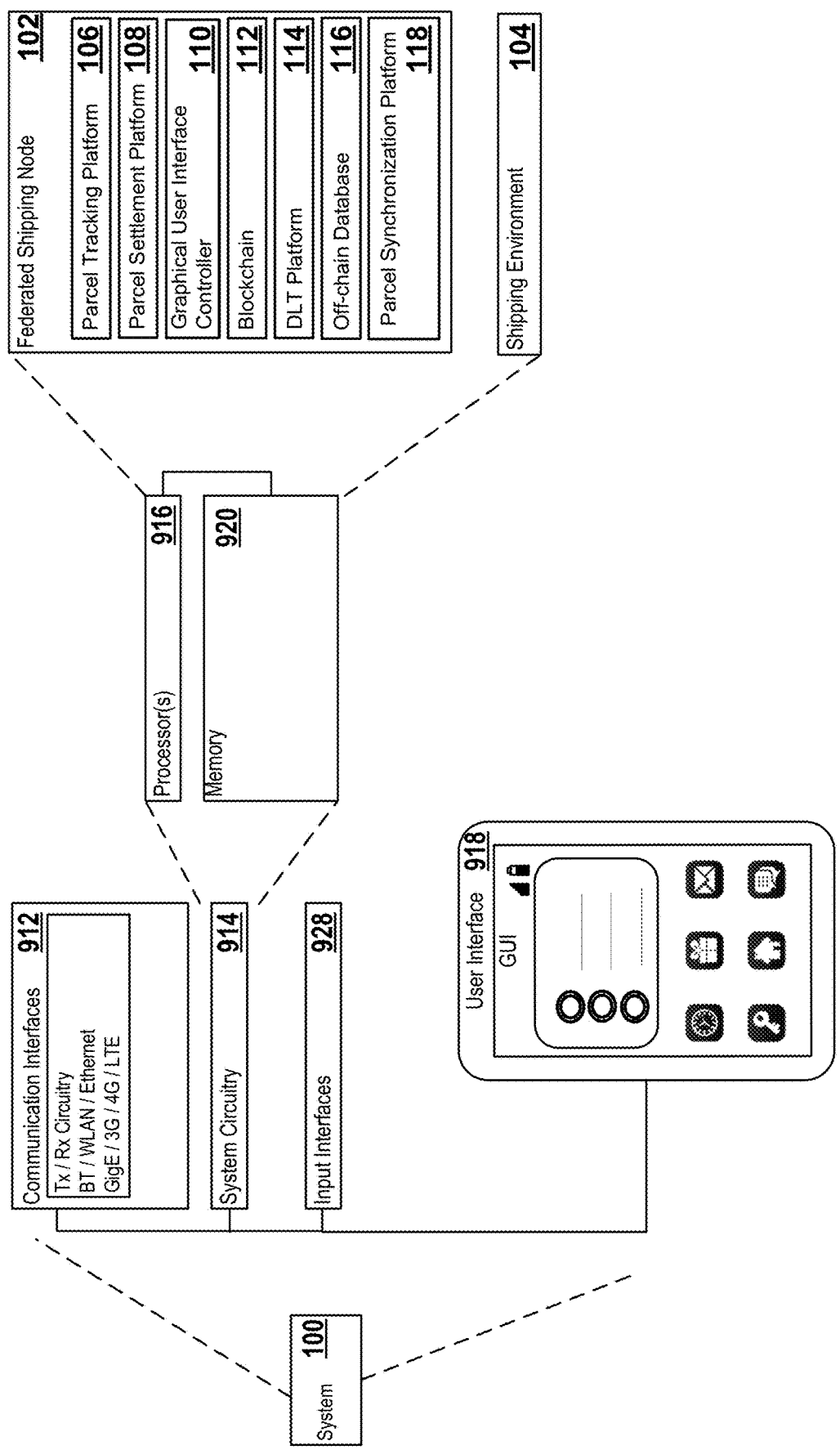
FIG. 9 illustrates a third example of a system.

FIG. 9 illustrates a third example of the system 100. The system 100 may include communication interfaces 912, input interfaces 928 and/or system circuitry 914. The system circuitry 914 may include a processor 916 or multiple processors. Alternatively, or in addition, the system circuitry 914 may include memory 920.

The processor 916 may be in communication with the memory 920. In some examples, the processor 916 may also be in communication with additional elements, such as the communication interfaces 912, the input interfaces 928, and/or the user interface 918. Examples of the processor 916 may include a general processor, a central processing unit, logical CPUs/arrays, a microcontroller, a server, an application specific integrated circuit (ASIC), a digital signal processor, a field programmable gate array (FPGA), and/or a digital circuit, analog circuit, or some combination thereof.

The processor 916 may be one or more devices operable to execute logic. The logic may include computer executable instructions or computer code stored in the memory 920 or in other memory that when executed by the processor 916, cause the processor 916 to perform the operations the federated shipping node 102, the parcel tracking platform 106, the parcel settlement platform 108, the graphical user interface controller 110, the blockchain 112, the DLT platform 114, the off-chain database 116, the parcel synchronization platform 118, the shipping environment 104, and/or the system 100. The computer code may include instructions executable with the processor 916.

The memory 920 may be any device for storing and retrieving data or any combination thereof. The memory 920 may include non-volatile and/or volatile memory, such as a random access memory (RAM), a read-only memory (ROM), an erasable programmable read-only memory (EPROM), or flash memory. Alternatively or in addition, the memory 920 may include an optical, magnetic (hard-drive), solid-state drive or any other form of data storage device. The memory 920 may include at least one of the federated shipping node 102, the parcel tracking platform 106, the parcel settlement platform 108, the graphical user interface controller 110, the blockchain 112, the DLT platform 114, the off-chain database 116, the parcel synchronization platform 118, the shipping environment 104, and/or the system 100. Alternatively or in addition, the memory 920 may include any other component or sub-component of the system 100 described herein.

The user interface 918 may include any interface for displaying graphical information. The system circuitry 914 and/or the communications interface(s) 912 may communicate signals or commands to the user interface 918 that cause the user interface to display graphical information. Alternatively or in addition, the user interface 918 may be remote to the system 100 and the system circuitry 914 and/or communication interface(s) may communicate instructions, such as HTML, to the user interface to cause the user interface to display, compile, and/or render information content and/or any disyllable content described herein. For example, the user interface 918 may display, or the system may generate instructions to display, any of the interactive views 602, 702, 802 described in reference to FIGS. 6-8. In some examples, the content displayed by the user interface 918 may be interactive or responsive to user input. For example, the user interface 918 may communicate signals, messages, and/or information back to the communications interface 912 or system circuitry 914.

The system 100 may be implemented with additional, different, or fewer components than illustrated. In some examples, the system 100 may be implemented with one or more logical components. For example, the logical components of the system 100 may be hardware or a combination of hardware and software. The logical components may include the federated shipping node 102, the parcel tracking platform 106, the parcel settlement platform 108, the graphical user interface controller 110, the blockchain 112, the DLT platform 114, the off-chain database 116, the parcel synchronization platform 118, the shipping environment 104, and/or any component or subcomponent of the system 100. In some examples, each logic component may include an application specific integrated circuit (ASIC), a Field Programmable Gate Array (FPGA), a digital logic circuit, an analog circuit, a combination of discrete circuits, gates, or any other type of hardware or combination thereof. Alternatively or in addition, each component may include memory hardware, such as a portion of the memory 920, for example, that comprises instructions executable with the processor 916 or other processor to implement one or more of the features of the logical components. When any one of the logical components includes the portion of the memory that comprises instructions executable with the processor 916, the component may or may not include the processor 916. In some examples, each logical component may just be the portion of the memory 920 or other physical memory that comprises instructions executable with the processor 916, or other processor(s), to implement the features of the corresponding component without the component including any other hardware. Because each component includes at least some hardware even when the included hardware comprises software, each component may be interchangeably referred to as a hardware component.

Some features are shown stored in a computer readable storage medium (for example, as logic implemented as computer executable instructions or as data structures in memory). All or part of the system and its logic and data structures may be stored on, distributed across, or read from one or more types of computer readable storage media. Examples of the computer readable storage medium may include a hard disk, a floppy disk, a CD-ROM, a flash drive, a cache, volatile memory, non-volatile memory, RAM, flash memory, or any other type of computer readable storage medium or storage media. The computer readable storage medium may include any type of non-transitory computer readable medium, such as a CD-ROM, a volatile memory, a non-volatile memory, ROM, RAM, or any other suitable storage device.

The processing capability of the system may be distributed among multiple entities, such as among multiple processors and memories, optionally including multiple distributed processing systems. Parameters, databases, and other data structures may be separately stored and managed, may be incorporated into a single memory or database, may be logically and physically organized in many different ways, and may implemented with different types of data structures such as linked lists, hash tables, or implicit storage mechanisms. Logic, such as programs or circuitry, may be combined or split among multiple programs, distributed across several memories and processors, and may be implemented in a library, such as a shared library (for example, a dynamic link library (DLL).

All of the discussion, regardless of the particular implementation described, is illustrative in nature, rather than limiting. For example, although selected aspects, features, or components of the implementations are depicted as being stored in memory(s), all or part of the system or systems may be stored on, distributed across, or read from other computer readable storage media, for example, secondary storage devices such as hard disks, flash memory drives, floppy disks, and CD-ROMs. Moreover, the various logical units, circuitry and screen display functionality is but one example of such functionality and any other configurations encompassing similar functionality are possible.

The respective logic, software or instructions for implementing the processes, methods and/or techniques discussed above may be provided on computer readable storage media. The functions, acts or tasks illustrated in the figures or described herein may be executed in response to one or more sets of logic or instructions stored in or on computer readable media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one example, the instructions are stored on a removable media device for reading by local or remote systems. In other examples, the logic or instructions are stored in a remote location for transfer through a computer network or over telephone lines. In yet other examples, the logic or instructions are stored within a given computer and/or central processing unit ("CPU").

Furthermore, although specific components are described above, methods, systems, and articles of manufacture described herein may include additional, fewer, or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, databases, tables, entities, and other data structures may be separately stored and managed, may be incorporated into a single memory or database, may be distributed, or may be logically and physically organized in many different ways. The components may operate independently or be part of a same apparatus executing a same program or different programs. The components may be resident on separate hardware, such as separate removable circuit boards, or share common hardware, such as a same memory and processor for implementing instructions from the memory. Programs may be parts of a single program, separate programs, or distributed across several memories and processors.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments have been described, it will be apparent to those of ordinary skill in the art that many more embodiments and implementations are possible. Accordingly, the embodiments described herein are examples, not the only possible embodiments and implementations.

What is claimed is:

1. A method, comprising:
   receiving shipping information for a parcel,
     the parcel being shipped by a shipping organization;
   interacting with a blockchain,
     the blockchain comprising a plurality of previous shipping states for the parcel and a smart contract comprising logic;
   determining, based on execution of the smart contract, a new shipping state for the parcel,
     the new shipping state determined based on the shipping information,
     the new shipping state indicative of shipping progress, and
     the shipping progress representative of a location, status, event, or combination thereof for a parcel when the parcel is between an origin location and a destination location;
   appending, based on execution of the smart contract, the new shipping state to the blockchain;
   pulling, from the blockchain for local execution, state update rules for transactions implemented on non-blockchain storage within the smart contract;
   replacing, based on local execution of the state update rules, a previous shipping state with the new shipping state in a non-blockchain cache,
     the previous shipping state being one of the plurality of previous shipping states, and
     the new shipping state being mapped to an identifier of the parcel stored in the non-blockchain cache and the blockchain;
   receiving the new shipping state from the non-blockchain cache at a device;
   displaying real-time information for the parcel,
     the displaying based on the new shipping state received by the device;
   receiving at least one of the plurality of previous shipping states from the blockchain at the device;
   displaying historic information for the parcel,
     the displaying based on the at least one of the previous shipping states received by the device; and
   sending the at least one of the plurality of previous shipping states to the device.

2. The method of claim 1, wherein the non-blockchain cache comprises a first non-blockchain cache hosted at a first geographic location and a second non-blockchain cache hosted at a second geographic location, the second geographic location being different from the first geographic location, the method further comprising:
   synchronizing the first non-blockchain cache with the second non-blockchain cache.

3. The method of claim 1, further comprising:
   receiving a settlement event for the parcel;
   determining, based on predetermined settlement rules, a new settlement state for the parcel;
   appending the new settlement state for the parcel to the blockchain; and
   replacing, in the non-blockchain cache, a previous settlement state for the parcel with the new settlement state.

4. The method of claim 3, wherein causing the device to display the historic information for the parcel further comprises:
   receiving previous settlement states from the blockchain;
   receiving at least a portion of the plurality of previous shipping states from the blockchain;
   sorting the previous settlement states and the at least a portion of plurality of previous shipping states chronologically; and
   sending the sorted settlement states and shipping states to the device for display.

5. The method of claim 3, further comprising:
   displaying a graphical user interface comprising a control, the control selectable to trigger the settlement event;
   accessing, in response to detection of the settlement event, a smart contract stored on the blockchain, the smart contract comprising logic configured to determine the new settlement state based on the previous settlement state; and
   executing the logic to determine the new settlement state.

6. The method of claim 1 wherein the shipping information is derived from sensor information created by a scanner scanning a label on the parcel.

7. The method of claim 1, further comprising:
   generating a graphical user interface, wherein a first portion of the graphical user interface comprises the new shipping state obtained from the non-blockchain cache and a second portion of the graphical user interface comprises at least one of the plurality of previous shipping states obtained from the blockchain.

8. A system, the system comprising:
a memory, the memory comprising:
   a blockchain storage portion,
     the blockchain storage portion comprising a blockchain,
     the blockchain comprising a plurality of previous shipping states; and
   a non-blockchain storage portion, the non-blockchain storage portion comprising a non-blockchain cache; and
a processor, the processor configured to:
receive shipping information for a parcel being shipped by a shipping organization;
access, from the blockchain, a smart contract comprising logic; and
execute the logic of the smart contract, the logic of the smart contract configured to cause the processor to:
determine a new shipping state for the parcel based on the shipping information, the new shipping state indicating shipping progress between an origin location and a destination location;
append the new shipping state for the parcel to the blockchain;
pull, from the blockchain for local execution, state update rules for transactions implemented on non-blockchain storage within the smart contract; and
based on local execution of the state update rules, replace, in the non-blockchain cache, a previous shipping state with the new shipping state, the new shipping state being mapped to an identifier of the parcel stored in the non-blockchain cache and the blockchain,
wherein the processor is further configured to:
cause a device to display real-time information for the parcel, the real time information comprising the new shipping state accessed from the non-blockchain cache; and
cause the device to display historical information for the parcel, the historical information comprising at least one of the plurality of previous shipping states accessed from the blockchain.

9. The system of claim 8, wherein the non-blockchain cache comprises a first non-blockchain cache hosted at a first geographic location, wherein the processor is further configured to:
synchronize the first non-blockchain cache with a second non-blockchain cache hosted at a second geographic location, the second geographic location being different from the first geographic location.

10. The system of claim 8, wherein the processor is further configured to:
receive a settlement event for the parcel;
determine, based on predetermined settlement rules, a new settlement state for the parcel;
append the new settlement state for the parcel to the blockchain; and
replace, in the non-blockchain cache, a previous settlement state for the parcel with the new settlement state for the parcel.

11. The system of claim 10, wherein to cause the device to display the historic information, the processor is further configured to:
receive previous settlement states from the blockchain;
receive the plurality of previous shipping states from the blockchain;
sort the previous settlement states and the plurality of previous shipping states chronologically; and
communicate an instruction display the sorted settlement states and shipping states.

12. The system of claim 10, wherein the processor is further configured to:
generate a graphical user interface comprising a control, the control selectable to trigger the settlement event;
access, in response to detection of the settlement event, a smart contract stored on the blockchain, the smart contract comprising logic configured to determine the new settlement state based on the previous settlement state; and
determine, based on execution of logic included in the smart contract, the new settlement state.

13. The system of claim 8, wherein the shipping information is derived from sensor information created by a scanner scanning a label on the parcel.

14. The system of claim 8, wherein the processor is further configured to:
generate a graphical user interface, wherein a first portion of the graphical user interface comprises the new shipping state obtained from the non-blockchain cache and a second portion of the graphical user interface comprises at least one of the plurality of previous shipping states obtained from the blockchain.

15. A non-transitory computer readable storage medium comprising computer executable instructions, the computer executable instructions executable by a processor, the computer executable instructions comprising:
instructions executable by the processor to:
receive shipping information for a parcel,
the parcel being shipped by a shipping organization;
instructions executable by the processor to:
access a blockchain comprising a plurality of previous shipping states and a smart contract;
instructions executable by the processor to:
cause execution of logic included in the smart contract, wherein execution of the logic causes the processor to:
determine a new shipping state for the parcel based on the shipping information,
the new shipping state indicative of shipping progress between an origin location and a destination location;
append the new shipping state to the blockchain;
pull, from the blockchain for local execution, state update rules for transactions implemented on non-blockchain storage within the smart contract; and
based on local execution of the state update rules, store the new shipping state in a non-blockchain cache,
wherein a previous shipping state for the parcel is replaced with the new shipping state, the new shipping state being mapped to an identifier of the parcel stored in the non-blockchain cache and the blockchain,
wherein the computer executable instructions further comprise:
instructions executable by the processor to:
display real-time information for the parcel,
the real time information comprising the new shipping state from the non-blockchain cache; and
instructions executable by the processor to:
display historical information for the parcel,
the historical information comprising at least one of the plurality of previous shipping states from the blockchain.

16. The non-transitory computer readable storage medium of claim 15, wherein the non-blockchain cache comprises a first non-blockchain cache hosted at a first geographic location, wherein the non-transitory computer readable storage medium further comprises:
instructions executable by the processor to synchronize the first non-blockchain cache with a second non-blockchain cache hosted at a second geographic location, the second geographic location being different from the first geographic location.

17. The non-transitory computer readable storage medium of claim 15, further comprising:
instructions executable by the processor to receive a settlement event for the parcel;
instructions executable by the processor to determine, based on predetermined settlement rules, a new settlement state for the parcel;
instructions executable by the processor to append the new settlement state for the parcel to the blockchain; and
instructions executable by the processor to replace, in the non-blockchain cache, a previous settlement state for the parcel with the new settlement state for the parcel.

18. The non-transitory computer readable storage medium of claim 17, wherein the instructions executable by the processor to display the historic information further comprise:
instructions executable by the processor to receive previous settlement states from the blockchain;
instructions executable by the processor to receive the plurality of previous shipping states from the blockchain;
instructions executable by the processor to sort the previous settlement states and the plurality of previous shipping states chronologically; and
instructions executable by the processor to communicate an instruction display the sorted settlement states and shipping states.

19. The non-transitory computer readable storage medium of claim 17, further comprising:
instructions executable by the processor to generate a graphical user interface comprising a control, the control selectable to trigger the settlement event;
instructions executable by the processor to access, in response to detection of the settlement event, a smart contract stored on the blockchain, the smart contract comprising logic configured to determine the new settlement state based on the previous settlement state; and
instructions executable by the processor to determine, based on execution of logic included in the smart contract, the new settlement state.

20. The non-transitory computer readable storage medium of claim 15, further comprising:
instructions executable by the processor to generate a graphical user interface, wherein a first portion of the graphical user interface comprises the new shipping state obtained from the non-blockchain cache and a second portion of the graphical user interface comprises at least one of the plurality of previous shipping states obtained from the blockchain.

* * * * *